No. 610,765. Patented Sept. 13, 1898.
W. MASON.
MEANS FOR DETACHABLY UNITING BARRELS TO STOCKS.
(Application filed Jan. 24, 1898.)
(No Model.) 5 Sheets—Sheet 1.
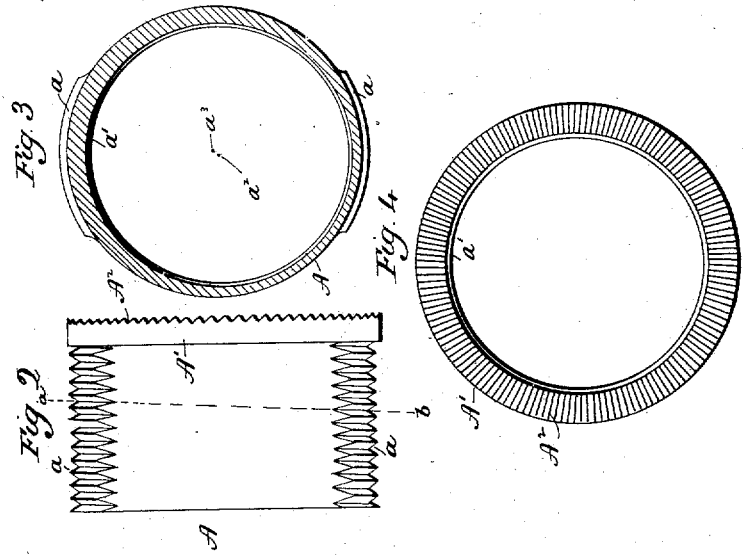
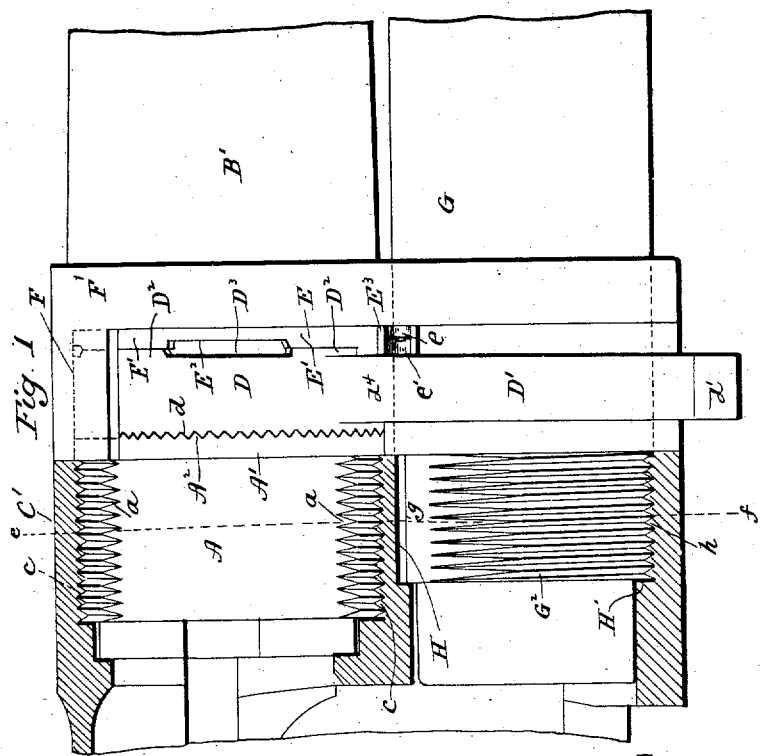

No. 610,765. Patented Sept. 13, 1898.
W. MASON.
MEANS FOR DETACHABLY UNITING BARRELS TO STOCKS.
(Application filed Jan. 24, 1898.)
(No Model.) 5 Sheets—Sheet 2.
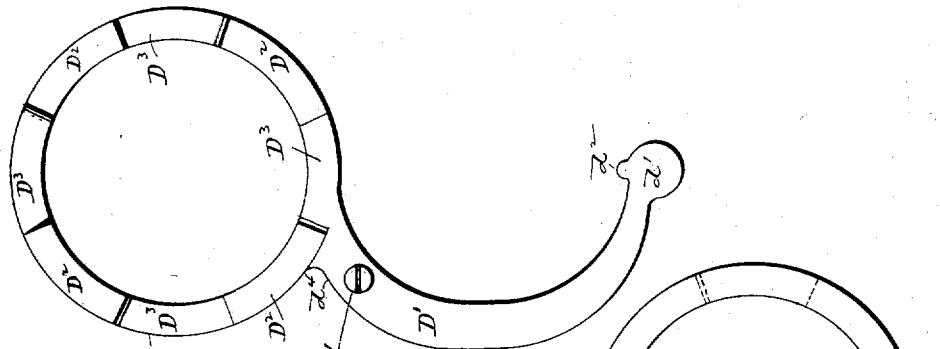
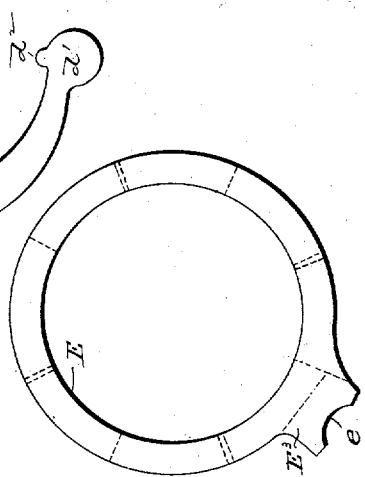
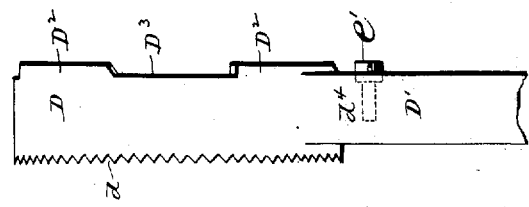
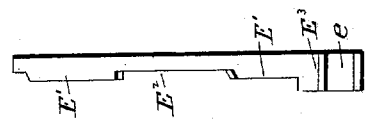
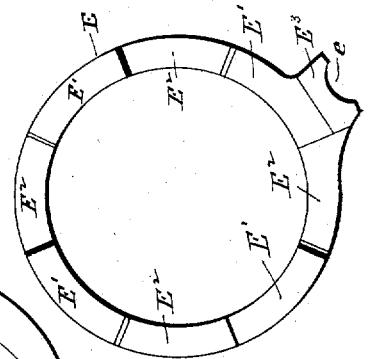
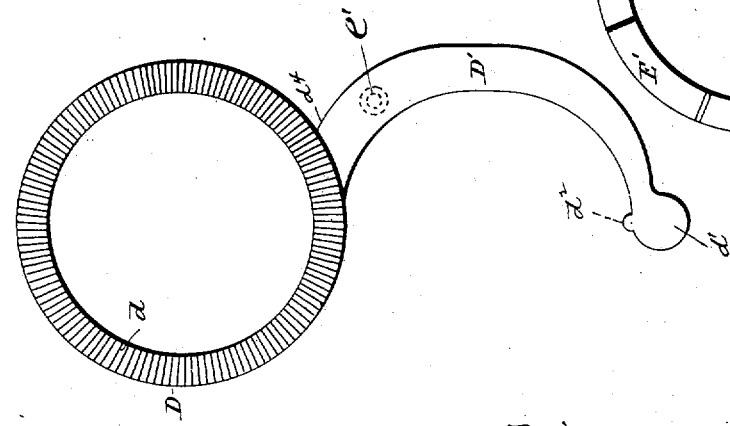
Witnesses
J. H. Thummay
Lillian D. Kelsey
William Mason,
Inventor.
By Atty Earle Seymour
THE NORRIS PETERS CO., PHOTO-LITHO., WASHINGTON, D. C.

No. 610,765. Patented Sept. 13, 1898.
W. MASON.
MEANS FOR DETACHABLY UNITING BARRELS TO STOCKS.
(Application filed Jan. 24, 1898.)
(No Model.) 5 Sheets—Sheet 3.
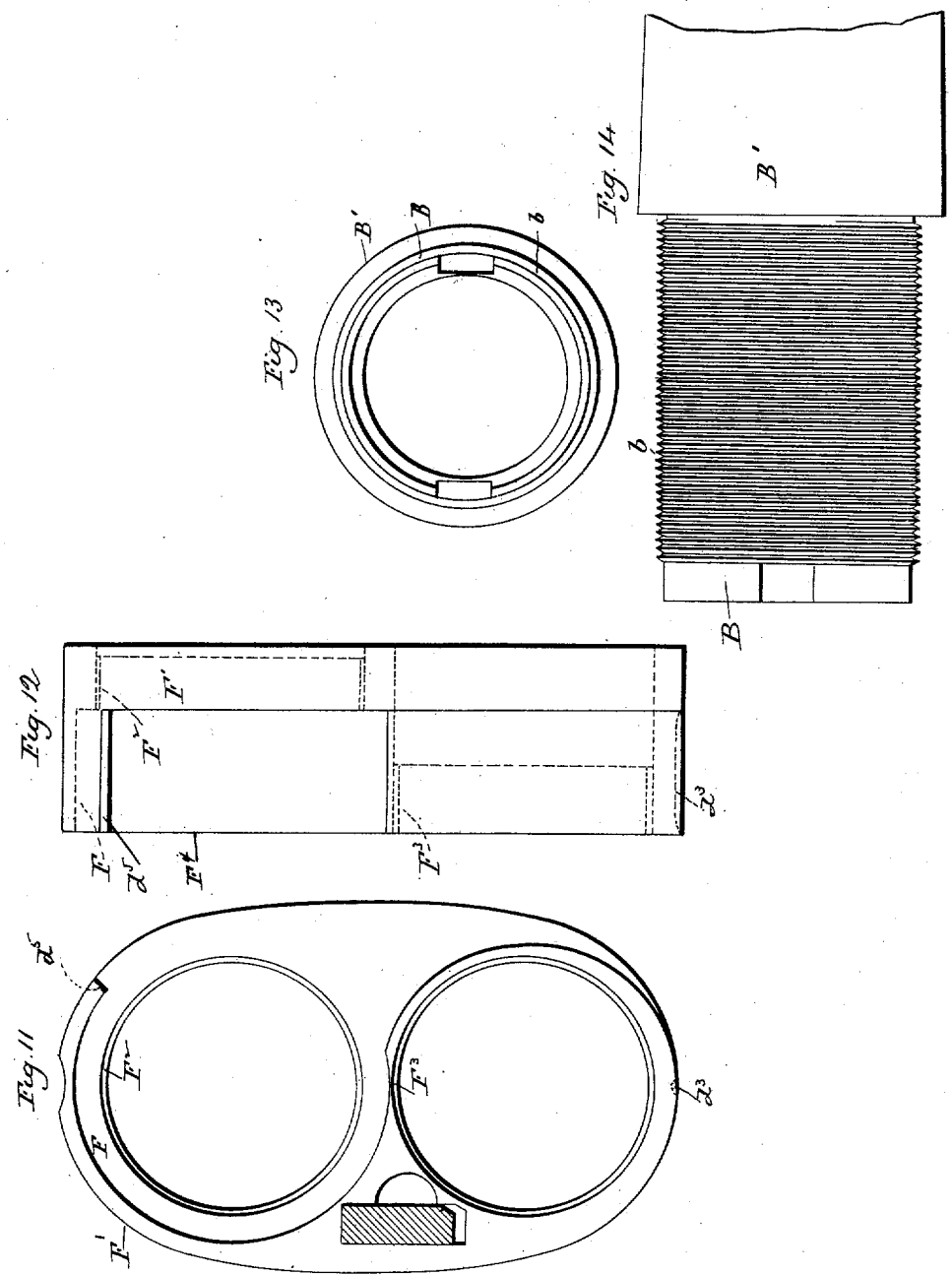

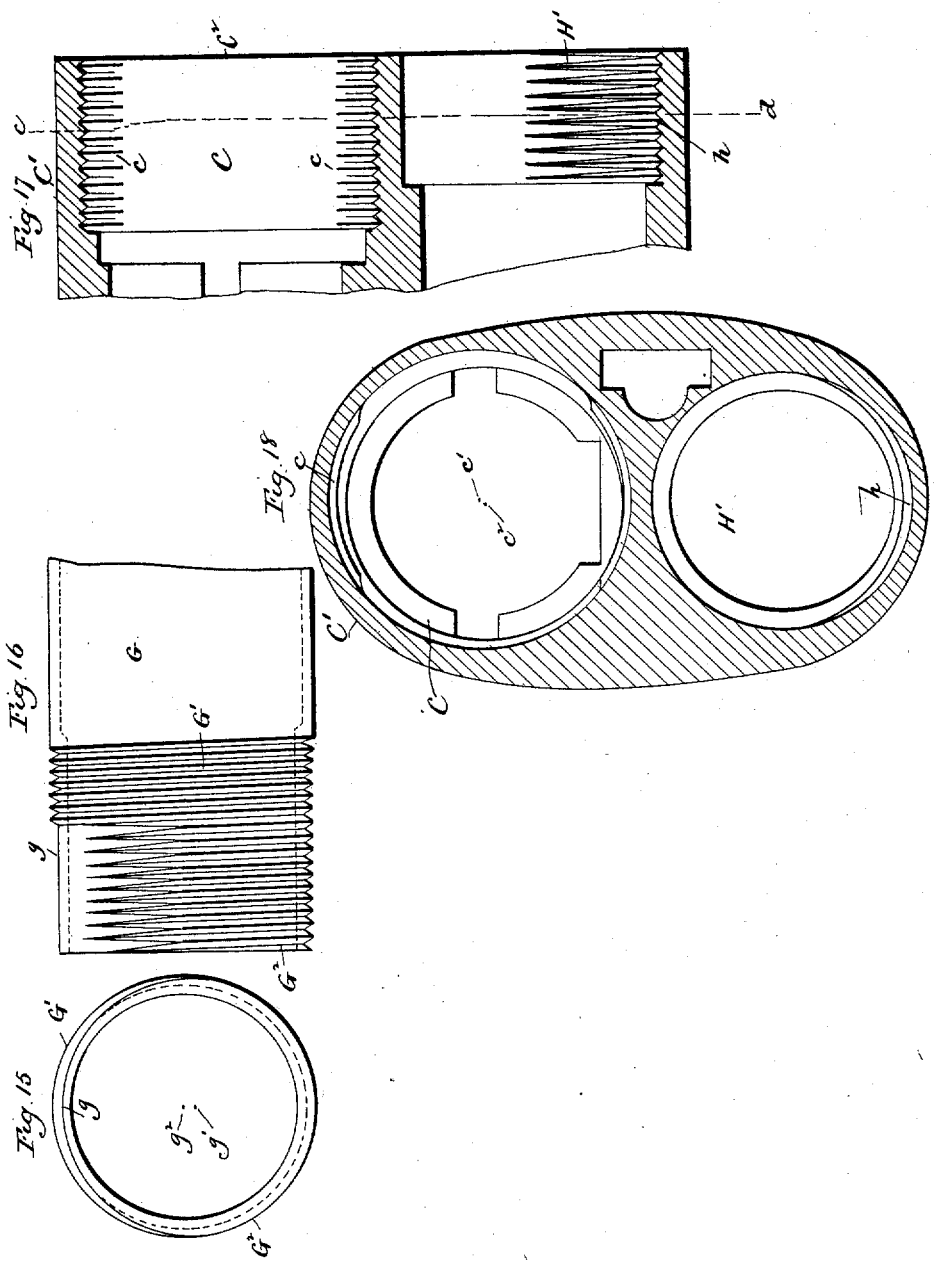

No. 610,765. Patented Sept. 13, 1898.
W. MASON.
MEANS FOR DETACHABLY UNITING BARRELS TO STOCKS.
(Application filed Jan. 24, 1898.)
(No Model.) 5 Sheets—Sheet 5.
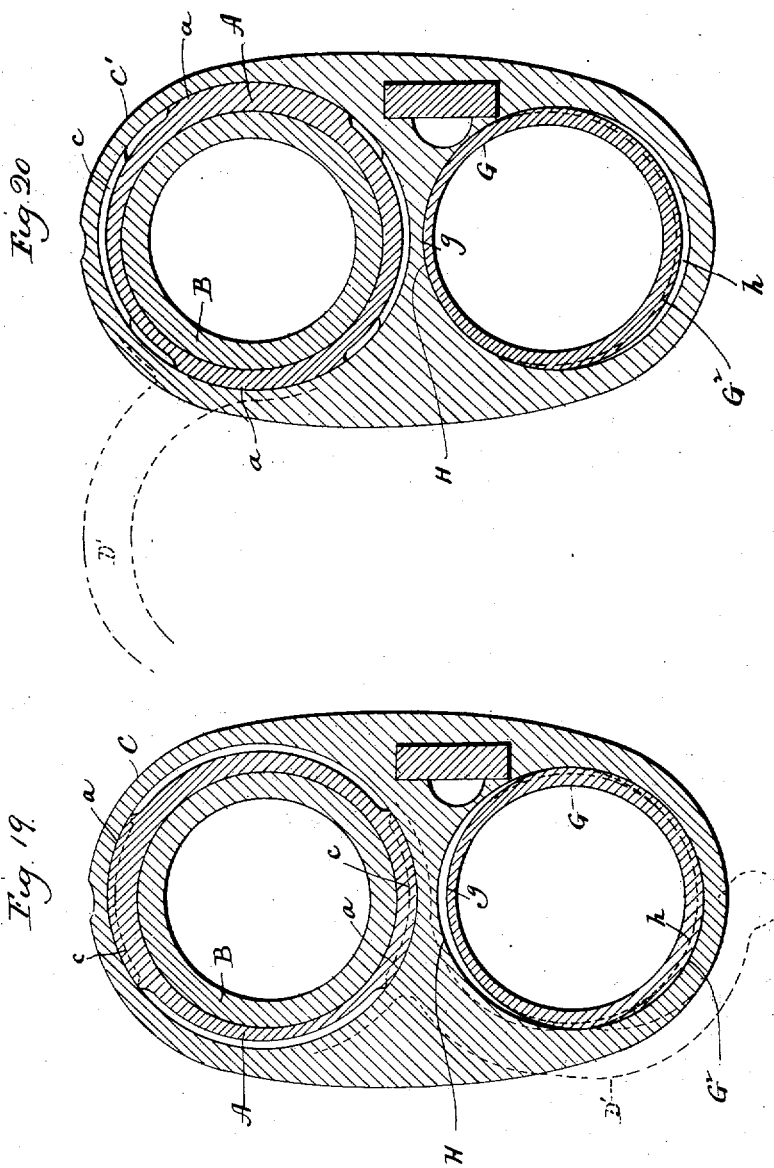

UNITED STATES PATENT OFFICE.

WILLIAM MASON, OF NEW HAVEN, CONNECTICUT, ASSIGNOR TO THE WINCHESTER REPEATING ARMS COMPANY, OF SAME PLACE.

MEANS FOR DETACHABLY UNITING BARRELS TO STOCKS.

SPECIFICATION forming part of Letters Patent No. 610,765, dated September 13, 1898.

Application filed January 24, 1898. Serial No. 667,701. (No model.)

*To all whom it may concern:*

Be it known that I, WILLIAM MASON, of New Haven, in the county of New Haven and State of Connecticut, have invented a new Improvement in Take-Down Guns; and I do hereby declare the following, when taken in connection with the accompanying drawings and the letters of reference marked thereon, to be a full, clear, and exact description of the same, and which said drawings constitute part of this specification, and represent, in—

Figure 1, a broken view, partly in side elevation and partly in vertical central section, of a gun constructed in accordance with my invention; Fig. 2, a detached view, in side elevation, of the take-up sleeve; Fig. 3, a view thereof in section on the line $a\,b$ of Fig. 2, in rear elevation; Fig. 4, a view thereof in front elevation; Fig. 5, a detached view, in rear elevation, of the coupling-ring, together with its operating-handle; Fig. 6, an edge view thereof, a portion of the handle being broken away; Fig. 7, a view thereof in front elevation; Fig. 8, a detached view, in rear elevation, of the locking-ring; Fig. 9, an edge view thereof; Fig. 10, a view thereof in front elevation; Fig. 11, a detached view, in rear elevation, of the band; Fig. 12, an edge view thereof; Fig. 13, a rear end view of the gun-barrel; Fig. 14, a broken view of the butt-end of the gun-barrel; Fig. 15, a rear end view of the magazine; Fig. 16, a broken view thereof in side elevation; Fig. 17, a broken sectional view of the gun-frame, showing the barrel-receiving and magazine-receiving openings formed therein; Fig. 18, a view in vertical section, on the line $c\,d$ of Fig. 17, of the forward end of the gun-frame, showing the said openings and the eccentricity of their threads; Fig. 19, a view in vertical transverse section on the line $e\,f$ of Fig. 1, showing the barrel and magazine in their locked positions; Fig. 20, a corresponding view showing the barrel and magazine as lifted preparatory to their withdrawal from the gun-frame.

My invention relates to an improvement in that class of guns which are known as "take-down" guns from the fact that they are constructed for the detachment of the barrel and magazine from the gun-frame to enable them to be more compactly packed for transportation, my present invention being an improvement upon the guns which were made the subject-matter of my pending applications, serially numbered 659,359 and 661,645, filed, respectively, November 22 and December 13, 1897.

The object of my invention is to produce a convenient and effective gun, with particular reference to taking up the wear incident to its repeated dismemberment and reassemblance and to locking the magazine in its home position by means of threads under a construction which permits the magazine to be moved rearward into its home position and withdrawn therefrom in a straight line instead of by rotary motion.

With these ends in view my invention consists, first, in improved means for taking up wear, and, second, in improved means for locking the magazine in its home position, the said means having certain details of construction, as will be hereinafter described, and pointed out in the claims.

Before proceeding to the detailed description of my improvements I may state that although they are, as herein shown, associated together in one gun they are not necessarily so associated, but may be used independently of each other, if desired. For this reason I shall describe them separately, first explaining the means for taking up wear.

In carrying out the said first part of my invention I employ a take-up sleeve A, having interrupted external threads $a$ and a continuous internal thread $a'$. The continuous internal thread $a'$ of the take-up sleeve corresponds to a continuous thread $b$ formed upon the butt-end B of the barrel B', while the interrupted external threads $a$ of the sleeve take into corresponding interrupted threads $c$ formed in the barrel-receiving opening C in the forward end of the gun-frame or receiver C'. I may here mention that the external threads $a$ and internal threads $a'$ of the take-up sleeve are preferably differentiated in pitch, as in illustration the external threads $a$ are coarser in pitch than the internal threads. By differentiating the threads of the sleeve, as described, it is better adapted to act as a take-up sleeve. However, instead of differentiating the threads I may make them on the same pitch, but have them run in opposite directions, under which construction the sleeve would still act as a take-up sleeve. The forward portion of the take-up sleeve is left unthreaded, as at A', the forward edge of the said unthreaded portion being formed with an annular band of radial teeth $A^2$, as very clearly shown in Figs. 2 and 4. These teeth coact with a corresponding annular band of radial teeth $d$ formed upon the rear edge of a coupling-ring D, having a bowed depending operating-handle D', which is slightly yielding and formed at its lower end with a knob $d'$, having an inwardly-projecting retaining-lug $d^2$, which the yielding character of the handle permits to be snapped into a small notch $d^3$ formed in the center of the lower edge of the band F'. The said coupling-ring D is stopped when it has been swung into its full-open position by the engagement of the outer edge of the base of its handle D' at about the point $d^4$, Fig. 5, with a stop-shoulder $d^5$, Fig. 11, formed in the upper portion of the band a little to one side of the center thereof. The inner periphery of this coupling-ring is unthreaded, but adapted in diameter to permit the ring to be mounted upon the forward portion of the threaded butt-end of the barrel. When the teeth $d$ of this ring are engaged with the teeth $A^2$ of the take-up sleeve, the ring and sleeve are coupled together, so that the sleeve may be rotated by the ring through the handle thereof, as required for connecting the barrel with and disconnecting it from the gun-frame. The said ring is maintained with its teeth $d$ in engagement with the teeth $A^2$ of the take-up sleeve by means of a locking-ring E, mounted upon the threaded butt-end B of the barrel B' at a point directly forward of the said coupling-ring, the front face of the coupling-ring being flat and its rear face being provided with four segmental locking-shoulders E', separated from each other by four depressions $E^2$ of corresponding length, one end of each of the said shoulders being beveled. The said shoulders and depressions coact with four corresponding locking-shoulders $D^2$ and with four corresponding depressions $D^3$ formed upon the forward edge of the coupling-ring, as clearly shown in Fig. 7, the said shoulders $D^2$ and recesses $D^3$ corresponding in arrangement to the shoulders E' and recesses $E^2$ of the locking-ring and one end of each of the shoulders $D^2$ being beveled. When the locking-ring is turned with respect to the coupling-ring so that the shoulders of the two rings are in engagement, the coupling-ring is thrust rearward, so as to maintain its teeth $d$ in engagement with the teeth $A^2$ of the take-up sleeve. When, however, the locking-ring is turned so as to bring its shoulders E' into registration with the recesses $D^3$ of the coupling-ring, the shoulders $D^2$ of which are then brought into registration with the recesses $E^2$ of the locking-ring, the coupling-ring may be pushed forward enough to disengage its teeth from those of the take-up sleeve, which may then be turned so as to move it rearwardly on the barrel until any wear that may exist is taken up. When wear has been taken up in this manner or by turning the coupling-ring without disturbing the sleeve, so as to secure, as it were, a new "bite" between the coupling-ring and sleeve, the locking-ring is turned back into its normal position, the shoulders E' upon its rear edge then riding out of the recesses $D^3$ of the coupling-ring and upon the shoulders $D^2$ of the coupling-ring, which is thus positively crowded rearward, so as to reëstablish connection between the coupling-ring and take-up sleeve. For maintaining the locking-ring in its locking position it is formed with an outwardly-projecting lug $E^3$, having a recess $e$, which receives a screw $e'$, inserted into the base of the operating-handle D' of the coupling-ring. When the screw is in position, of course the two rings rotate together; but when the screw is removed the locking-ring may be turned independently of the coupling-ring. Other ways might obviously be resorted to for holding the locking-ring in its normal or locking position. The said coupling and locking rings are housed, so to speak, within a deep recess F formed in the upper portion of the rear face of the band F', by means of which the gun-barrel B' and the tubular magazine G are rigidly secured together at their rear ends, the upper end of the band having a threaded opening $F^2$, receiving the threaded butt-end of the barrel, and the lower end of the band having a threaded opening $F^3$, receiving the continuously-threaded portion G', Fig. 16, of the rear end of the magazine.

With reference now to the second part of my invention, relating to the locking of the magazine in its home position by threads without necessitating the rotation of the magazine either for its introduction into or removal from the gun-frame, I form upon the extreme rear end of the magazine interrupted threads $G^2$, placed so that they embrace its lower half. As shown, these threads also extend partially over the upper half of the magazine; but this is an incident of their production rather than a matter of necessity. In this connection I may explain that in order to make the rear end of the magazine of eccentric form its top portion is cut away on the line $g$ of Fig. 15, this line being struck from the point $g'$, which is a short distance below the true center $g^2$ of the magazine, of which the point $g'$ may be said to be the eccentric center. The distance between these two centers represents the eccentricity of the rear end of the magazine and the distance through which it is lifted and depressed in unlocking and locking it. The space through which the said rear end of the magazine is lifted and depressed for unlocking and locking it is designated by H in Fig. 1. For the reception of the magazine-threads $G^2$ the magazine-receiving opening H' of the receiver is formed with interrupted threads $h$, which correspond to the threads G² aforesaid. For the purpose of raising and lowering the magazine as described the take-up sleeve A is made eccentric, as very clearly shown in Fig. 3. In this figure the true center $a^2$ is the center from which the continuous threads $a'$ of the sleeve are struck, while the eccentric center, if I may use the term again, is indicated by the point $a^3$, from which the interrupted threads $a$ are struck. To conform the interrupted threads $c$ of the barrel-receiving opening C of the gun-frame C' to the construction of the take-up sleeve, the interrupted threads $c$ are struck from a center $c'$, Fig. 18, which corresponds to the eccentric center $a^3$ of the sleeve.

In Fig. 18, $c^2$ designates the true center of the barrel-receiving opening. The distances between the true and eccentric centers mentioned will be proportioned in any particular gun to the rotation of the take-up sleeve required in that gun for connecting and disconnecting the barrel. It will be understood that when the take-up sleeve is rotated its thicker portion is moved down, so to speak, partially under the barrel, whereby the barrel and band, and hence the magazine, are lifted with respect to the gun-frame, the magazine being sufficiently raised, as shown in Fig. 20, to lift its interrupted threads G² from the interrupted threads $h$ of the magazine-receiving opening. In turning the take-up sleeve as described its interrupted threads $a$ are disengaged from the interrupted threads $c$ of the barrel-receiving opening in the gun-frame at the same time the magazine-threads G² are lifted out of engagement with the threads $h$ of the magazine-receiving opening in the gun-frame. Therefore when the sleeve has been turned as described both the barrel and magazine are in position to be drawn directly away from the gun-frame. They are reintroduced in the same manner, after which the coupling-ring is turned by its handle, so as to rotate the take-up sleeve, whereby the interrupted threads of the sleeve are reëngaged with the interrupted threads of the gun-frame and the barrel, band, and magazine are positively moved downward with respect to the frame, so as to reëngage the threads of the magazine with those of the magazine-receiving opening. In these operations the rear face F⁴ of the band may be said to ride up and down upon the forward face C² of the gun-frame.

In view of the modifications suggested and of others which may obviously be made I would have it understood that I do not limit myself to the exact construction herein shown, but hold myself at liberty to make such changes and alterations as fairly fall within the spirit and scope of my invention.

Having fully described my invention, what I claim as new, and desire to secure by Letters Patent, is—

1. A take-down gun having a gun-frame, a gun-barrel, an internally and externally threaded take-up sleeve mounted on the gun-barrel, and taking into the threads formed in the gun-frame, a coupling-ring mounted upon the gun-barrel, and adapted to be coupled in different positions of adjustment with the said sleeve, and a locking-ring also mounted upon the gun-barrel, and adapted to positively hold the coupling-ring coupled with the take-up sleeve.

2. A take-down gun having a gun-frame, a gun-barrel, an internally and externally threaded take-up sleeve mounted upon the gun-barrel, and taking into threads formed in the gun-frame, a coupling-ring mounted upon the gun-barrel, and adapted to be coupled in different positions of adjustment with the take-up sleeve, and a locking-ring also mounted upon the gun-barrel, and adapted to be normally coupled with the coupling-ring so as to rotate therewith.

3. A take-down gun having a gun-frame, a gun-barrel, an internally and externally threaded take-up sleeve mounted upon the gun-barrel, and having its forward end formed with a band of locking-teeth, a coupling-ring mounted upon the gun-barrel, and having its rear end formed with a band of locking-teeth corresponding to those of the take-up sleeve, and a locking-ring mounted upon the gun-barrel at a point forward of the coupling-ring, and constructed to normally keep the same crowded rearward, and thus coupled with the take-up sleeve.

4. A take-down gun having a gun-frame, a gun-barrel, a tubular magazine, a band having threaded openings for the reception of the threaded rear ends of the said barrel and magazine which it rigidly connects, an internally and externally threaded take-up sleeve mounted on the projecting butt-end of the barrel, a coupling-ring mounted upon the barrel in position to be coupled with the said take-up sleeve, and a locking-ring mounted upon the barrel at a point forward of the coupling-ring, and constructed to normally hold the coupling-ring coupled with the take-up sleeve, the said coupling-ring and locking-ring being located within a deep recess formed in the upper end of the rear face of the said band.

5. A take-down, tubular-magazine gun, having a gun-frame provided with a magazine-receiving opening formed with interrupted threads, a tubular magazine formed with corresponding threads, and means for imparting positive lateral movement to the magazine so as to engage and disengage its threads with those of the frame, whereby the magazine may be inserted into and withdrawn from the gun-frame without rotating it and in a line parallel with the longitudinal axis of the gun-barrel which remains stationary while the magazine is being moved back and forth for its insertion into and withdrawal from the gun-frame.

6. A take-down gun having a gun-frame, a barrel, and a tubular magazine, a band rigidly uniting the rear ends of the magazine and barrel, an internally and externally threaded take-up sleeve mounted on the projecting butt-end of the barrel, and having its external threads struck from an eccentric center for coaction with correspondingly-struck threads formed within the barrel-receiving opening of the gun-frame, means for rotating the said take-up sleeve, whereby the barrel, band and magazine are positively raised and lowered with respect to the gun-frame, and interrupted threads formed upon the magazine, and engaged with and disengaged from corresponding interrupted threads formed within the magazine-receiving opening of the gun-frame.

7. A take-down gun having a gun-frame, a gun-barrel, a take-up sleeve mounted on the gun-barrel, and a coupling-ring also mounted upon the gun-barrel, adapted to be coupled in different positions of adjustment with the said sleeve, and provided with a handle, adapted at its lower end to be snapped into a fixed part of the gun for holding the said ring in place.

8. A take-down gun having a gun-frame, a gun-barrel, a tubular magazine, a band uniting the rear ends of the barrel and magazine, a take-up sleeve mounted upon the gun-barrel, a locking-ring also mounted upon the gun-barrel and adapted to be coupled in different positions of adjustment with the said sleeve, and provided with a handle formed at its lower end with a retaining-lug adapted to be snapped into a retaining-recess formed in the lower portion of the band.

9. A take-down gun having a gun-frame, a gun-barrel, a tubular magazine, a band uniting the rear ends of the barrel and magazine, a take-up sleeve mounted upon the gun-barrel, and a coupling-ring also mounted upon the gun-barrel, and adapted to be coupled in different positions of adjustment with the said sleeve, and formed with a depending handle which engages with a stop-shoulder formed upon the band to stop the rotation of the sleeve when it reaches its full-open position.

In testimony whereof I have signed this specification in the presence of two subscribing witnesses.

WILLIAM MASON.

Witnesses:
DANIEL H. VEADER,
THOMAS C. JOHNSON.